United States Patent Office 3,035,515
Patented May 22, 1962

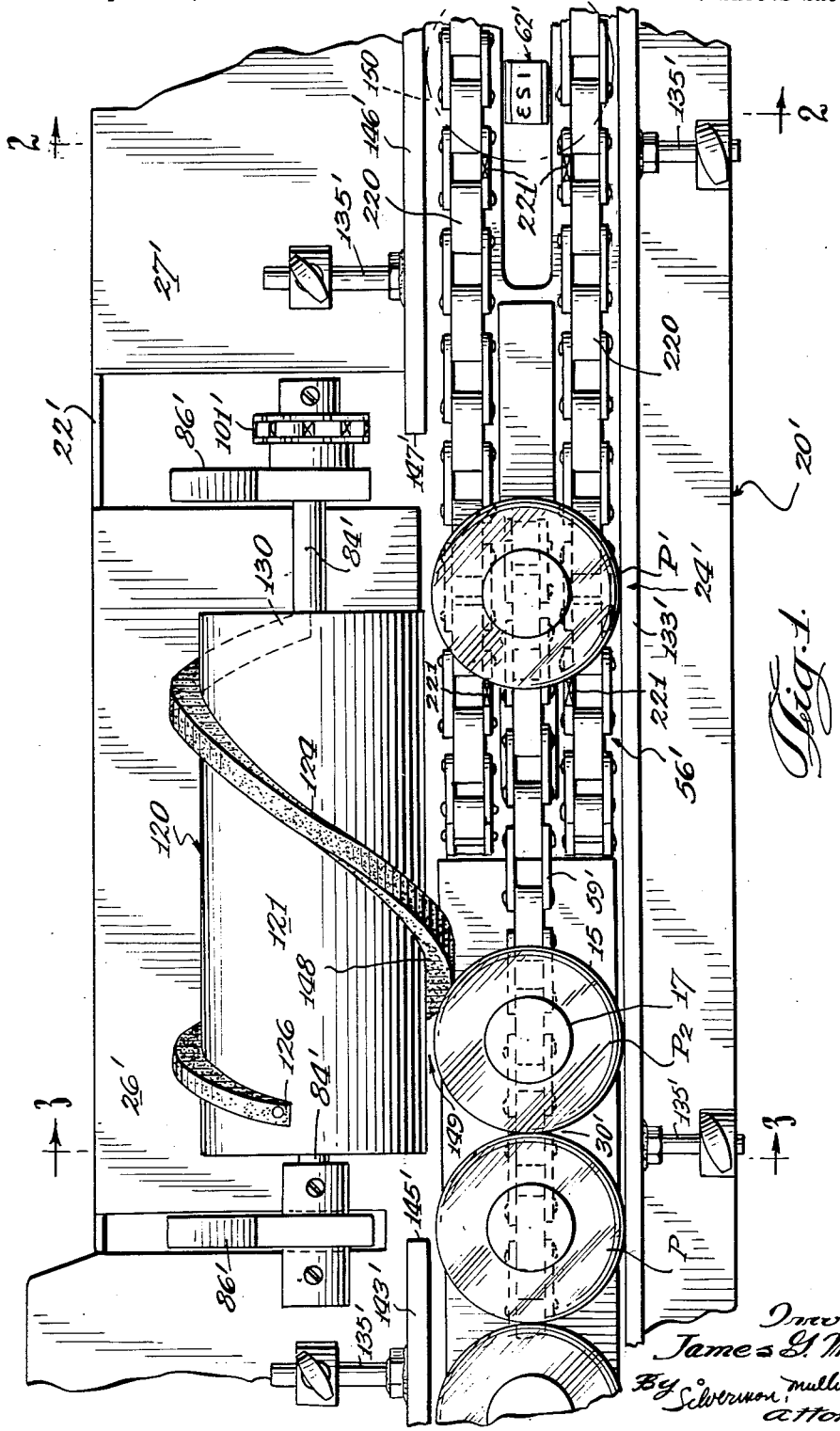

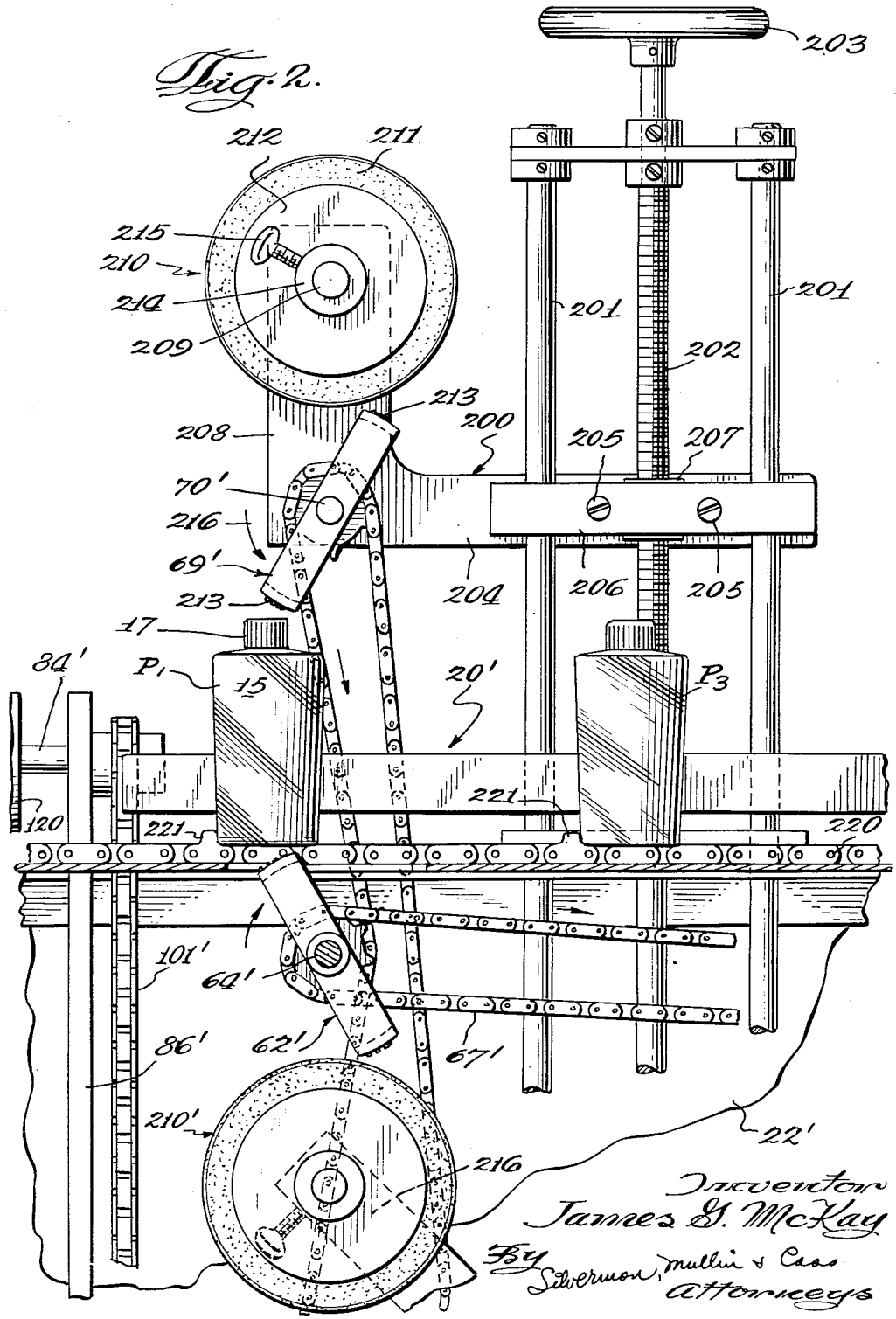

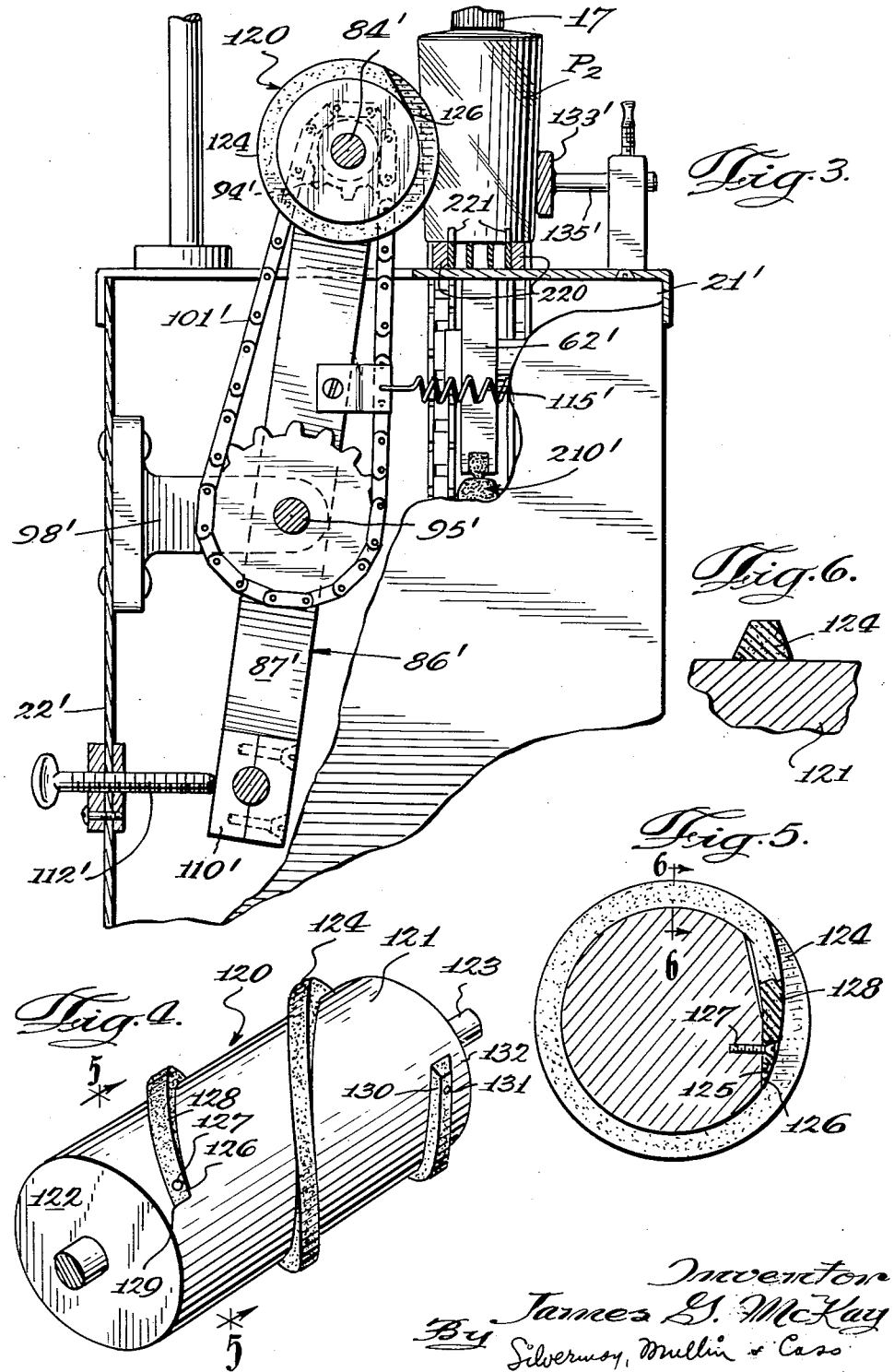

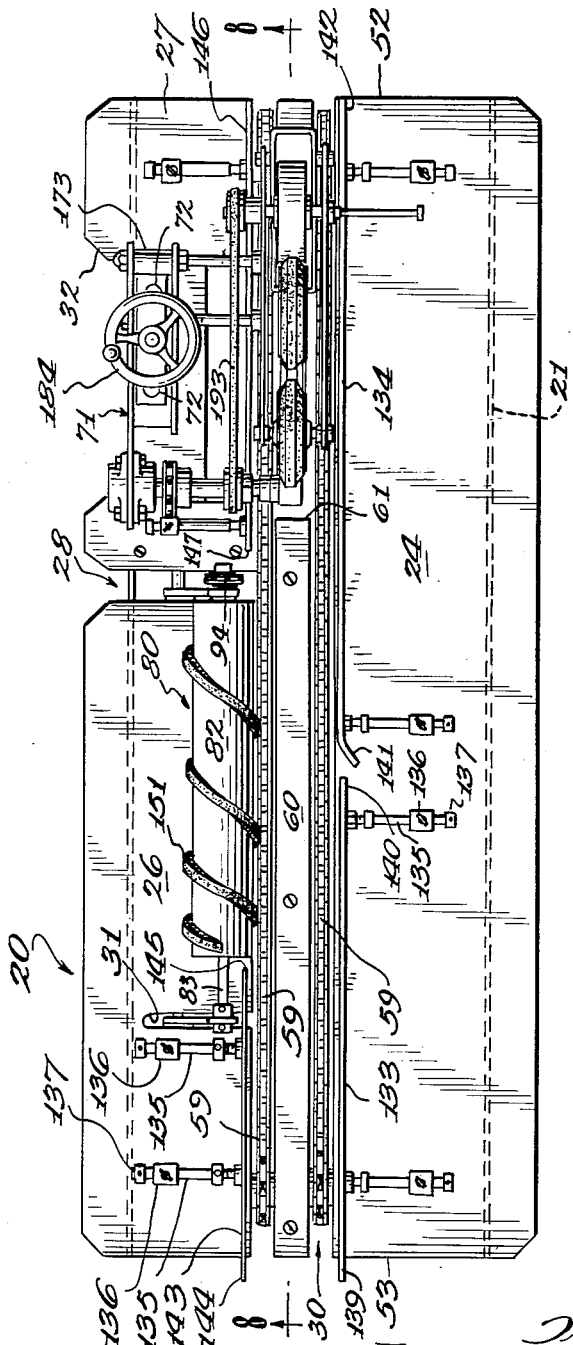

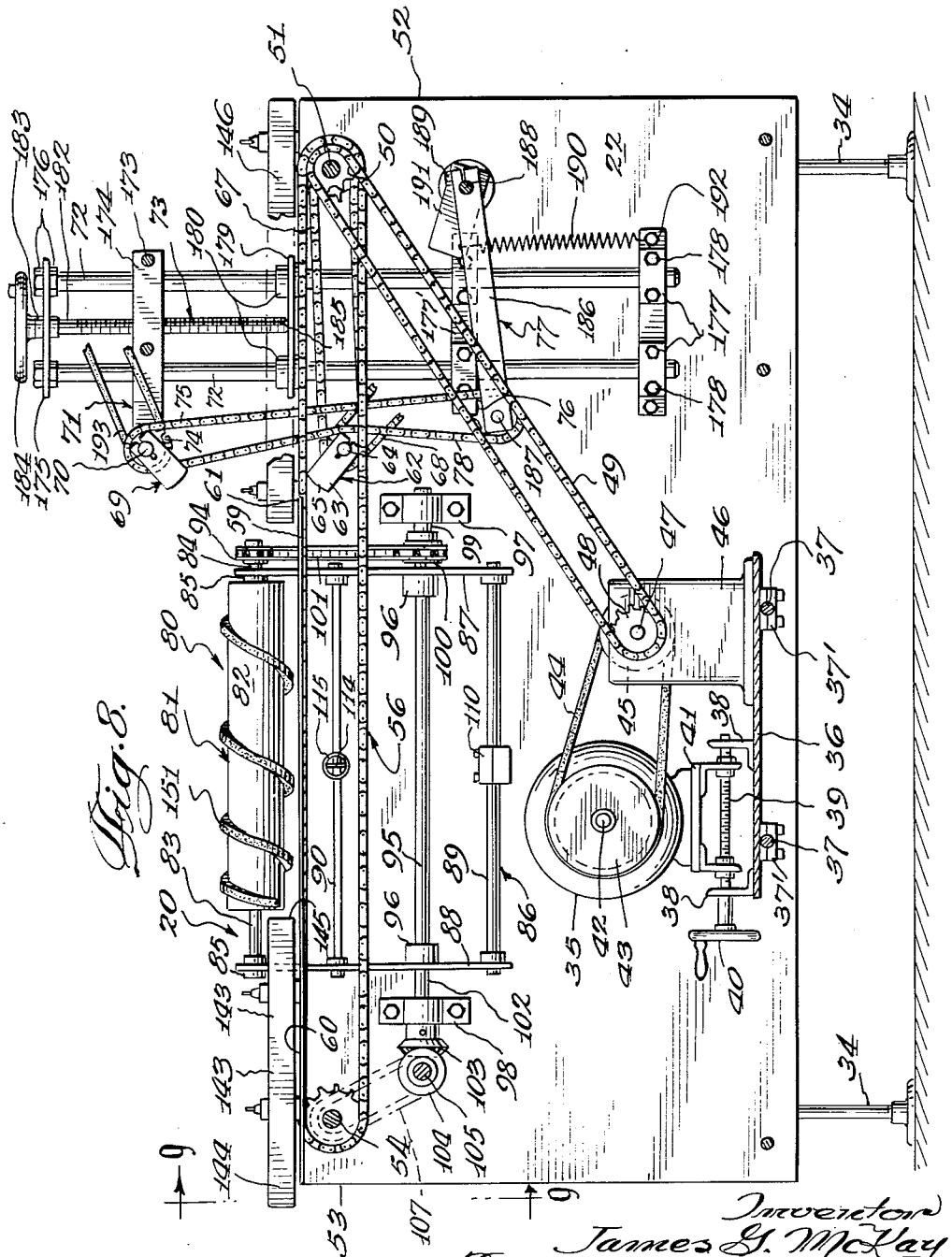

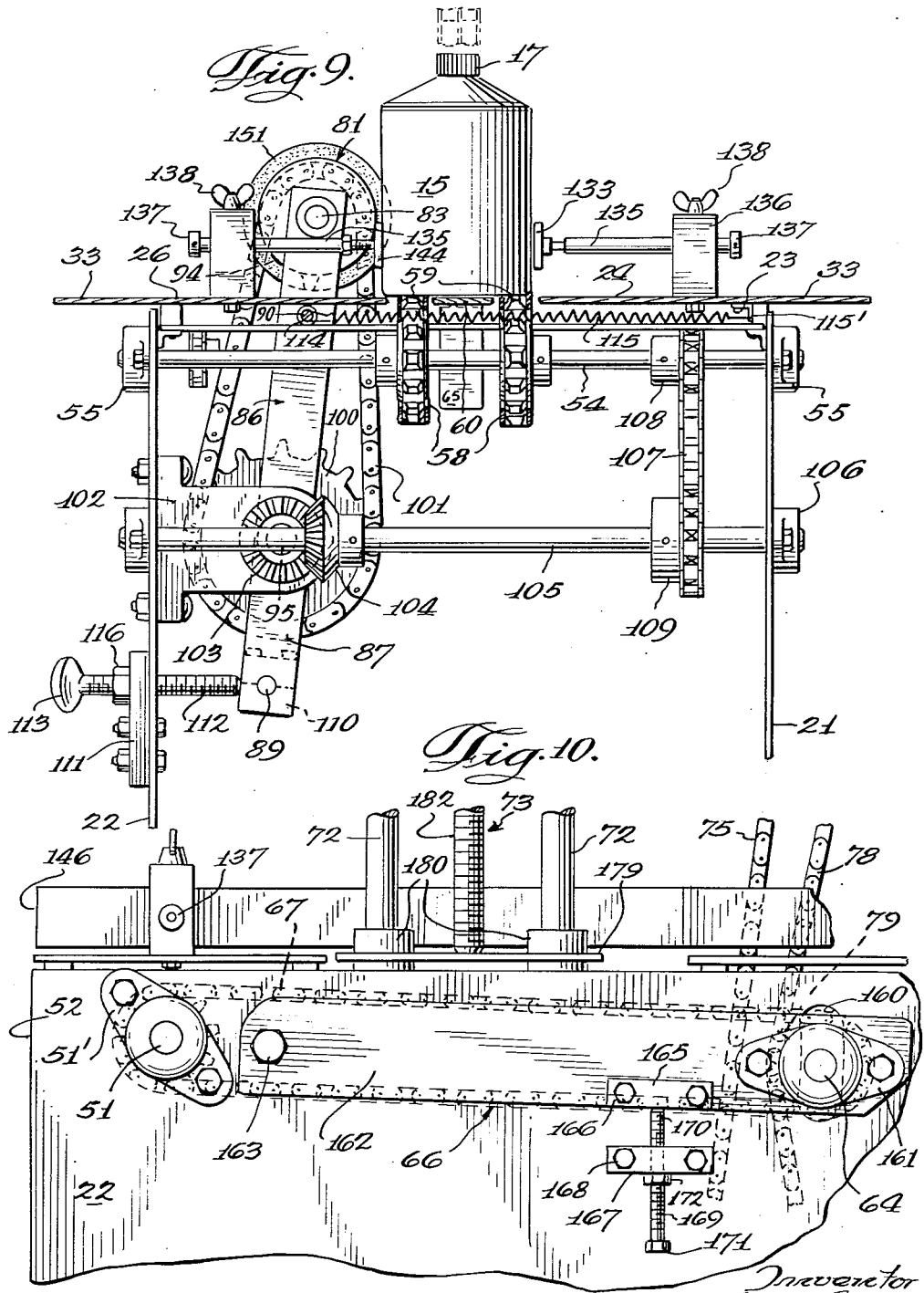

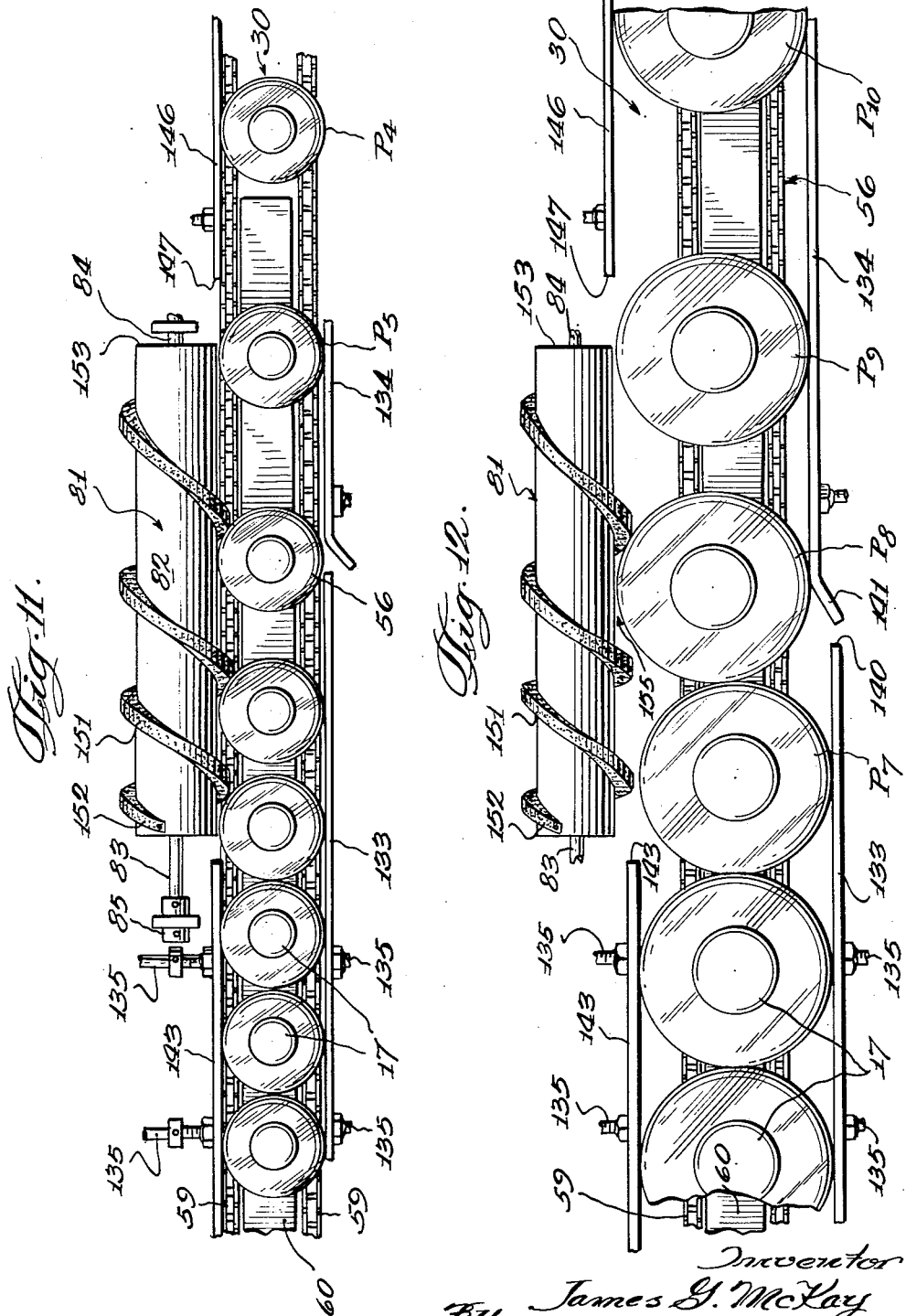

3,035,515
PACKAGE IMPRINTING APPARATUS
James G. McKay, 5138 N. Mobile Ave., Chicago, Ill.
Filed Apr. 25, 1958, Ser. No. 730,906
1 Claim. (Cl. 101—37)

This invention relates generally to marking apparatus and more particularly is concerned with improvements in automatic imprinting apparatus for successively marking packages transported in a continuous line past a moving printing device.

In apparatus of the type with which this invention is concerned packages usually are loaded on the apparatus at one end thereof to be transported by means of a conveyor to the opposite end thereof. Thus, the apparatus may be loaded manually or may be stationed to receive the packages from other equipment, such as, a labeling machine or a package filling machine or the like. Intermediate the said ends is stationed a printing device, usually of the continuous rotating type, in position to apply an imprint to a surface of each package passing the same during a predetermined part of its cycle of revolution. In loading the packages at one end of the apparatus, the packages are haphazardly arranged or bunched together so that they would be transported into the printing zone of the apparatus in such disposition entirely uncorrelated to the printing cycle of the printing device, namely, each package of the line would not be in required position to receive an imprint during the precise part of the cycle of revolution of the printing device at which an imprint could be transferred thereto by the printing device. Consequently, it is necessary that the packages be fed into the printing zone at predetermined spaced intervals correlated to the cyclic operation of the printing device. It is a principal object of this invention to provide package imprinting apparatus of the character described in which is provided novel package feeding means for spacing the packages of a continuous line at proper intervals for movement past a rotatable printing device so that each package of the moving line will be in proper position to receive the imprint on a surface thereof.

In connection with the preceding object, a further purpose of the invention is to provide novel package feeding means which comprises a worm feed member positioned with its axis of rotation parallel with and laterally spaced from the path of travel of the packages on the apparatus, said apparatus having conveyor means for moving the packages at a predetermined linear speed and said worm feed located to intercept the packages individually for purpose of reducing the linear speed of movement thereof temporarily, thereafter, to permit the linear speed of the package to increase gradually and finally, to release the package precisely at the time when the package has resumed its linear movement equal to the linear speed of the conveyor whereby individual packages are continuously fed to the printing zone of the apparatus at properly spaced intervals for receiving an imprint from a cyclically operating printing device.

Another important object of the invention is to provide a package feeding mechanism for apparatus of the character described which is adjustably mounted with respect to the linear path of travel of the packages so that the mechanism can be operated with packages of varying sizes.

A further object of the invention is to provide a worm feed mechanism of the character described which includes a resiliently mounted framework having the worm feed member journalled thereon, said framework capable of lateral movement relative the path of travel of the packages against tension to prevent damage to the worm feed mechanism by reason of inadvertent jamming of the packages therewith or inadvertent discripancy in the size of the package engaged thereby by reason of the selected adjustment of the mechanism to accommodate a package of a predetermined size.

Still a further object is to provide package feeding means of the character described which in a modified form thereof can be used in connection with packages differing in size one relative the other.

Another object of the invention is to provide novel adjustable guide rails cooperable with the worm feed mechanism, said guide rails being positioned on opposite sides of the conveyor provided on the apparatus and adjustable laterally relative the conveyor for permitting use of the apparatus with different sizes of packages.

Still other important objects of the invention are to provide apparatus of the character described which may include one or more rotatable printing devices selectively adjustable in the axis of rotation thereof relative the path of movement of the packages; which may include inking means for the printing devices likewise selectively adjustable; which may include means for varying the linear speed of the conveyor and corresponding angular speed of the worm feed component while still maintaining operative relation therebetween and the printing device; and which includes an embodiment of the invention in a self-contained unit in which the moving components thereof are driven from a single source of power.

Various other objects will become apparent from the ensuing description of the invention, not the least of which includes the provision for ready servicing of the apparatus and easy replacement of parts occasioned by the advantageous construction thereof. The imprinting apparatus embodying the invention will be seen to be characterized by a degree of versatility of operation which makes the same suitable for imprinting at a variety of selected locations on the packages as well as on the ends of packages in which the package ends are planar or concave in configuration. It is believed the invention resides both in the combination of mechanisms which cooperate to provide a self-contained unit having the advantages described and in certain of the individual mechanisms thereof which may be capable of independent use in other package imprinting apparatus.

In the drawings:

FIG. 1 is a fragmentary plan view of package printing apparatus embodying the invention and showing one form of worm feed mechanism positioned for controlling the spaced intervals between successive packages fed to a rotatable printing device located to imprint on the bottom of each package.

FIG. 2 is a fragmentary sectional view taken through said apparatus along the line 2—2 of FIG. 1 and in the direction indicated.

FIG. 3 is a fragmentary sectional view taken through said imprinting apparatus along the line 3—3 of FIG. 1 and in the direction indicated.

FIG. 4 is a perspective view of one form of the worm feed member.

FIG. 5 is a sectional view taken along the line 5—5 of FIG. 4.

FIG. 6 is a sectional view taken along the line 6—6 of FIG. 5.

FIG. 7 is a plan view of a self contained package printing apparatus constructed to accommodate a worm feed mechanism in which the worm feed member is longer than that shown in FIG. 4.

FIG. 8 is a sectional view taken longitudinally through said apparatus along the line 8—8 of FIG. 7 and in the direction indicated.

FIG. 9 is a sectional view taken through the apparatus along the line 9—9 of FIG. 8 and in the direction indicated.

FIG. 10 is fragmentary elevational view from the right hand side of FIG. 9 to show means for adjusting elevation of the lower printing device relative packages moving on the conveyor of the apparatus.

FIG. 11 is a fragmentary plan view of the apparatus of FIG. 7 showing the manner in which the worm feed mechanism operates in conjunction with packages of a relatively smaller size and FIG. 12 is a fragmentary plan view of a similar nature showing adjustments in the apparatus for use with a larger size package.

In describing the invention, in detail, reference will be had to a package or container of familiar type having a cylindrical body 15 closed at its bottom end by a transverse wall which may be flat or concave and having a dispensing neck to which a cap 17 is attached. The package is exemplary only since the apparatus embodying the invention is readily adjustable for imprinting on other types of packages, such as the familiar beer can or other type of beverage container, in which one or both ends of the container are either flat or concave. Also, the apparatus may be suitably modified for imprinting on a lateral surface of a package and the material from which the package is formed is of no consequence to the operation of the invention. The purpose or need for applying an imprint at a desired location on the package is well understood, such as to supply date of packaging, inventory storage data, code indica for various purposes, and the like.

Illustrated in FIGS. 7 and 8 is an imprinting apparatus designated generally 20 which represents embodiment of the invention into a complete or self-contained unit. Said apparatus has pair of vertically arranged side plates 21 and 22 retained in laterally spaced assembly by means of suitable cross-bracing and the various shafts journalled at their ends in said plates upon which operating components of the apparatus are mounted. Said side plates also function as lateral enclosure members which in cooperation with suitably installed end walls (not shown) form a box-like enclosure or cabinet for many of the moving components of the apparatus. On the upper ends of said side plates is a table surface provided by the rectangular metal plate 24 extending the entire length of the apparatus supported on side plate 21 and the shorter plates 26 and 27 supported on the side plate 22, as by angle brackets 23. Plates 26 and 27 are spaced apart at facing ends thereof to provide a transverse passageway 28 connecting with the passageway 30 which extends the entire length of the apparatus substantially midway between the side plates. To provide said passageway 30, plates 24 and 26, 27 are spaced apart uniformly along facing longitudinal edges thereof. The plate 26 has a medial transverse slot 31 connecting at one end thereof with passageway 30 and parallel with the passageway 28. Plate 27 has a cut-out 32 in the outside longitudinal edge thereof to permit convenient handling of certain adjustment mechanism protruding above said table surface which will be seen to be provided by the co-planar arranged plates 24, 26 and 27. As seen in FIG. 9, the plate 24 may have an overhang portion 33 extending beyond side plate 21 and the plates 26 and 27 may be sufficiently wide to provide a similar overhang extending beyond side plate 22. The entire apparatus may be supported on legs 34.

Referring to FIG. 8, the operating components of the apparatus 20 preferably are driven from a single source of power such as the electric motor 35 of small-fraction horsepower. The motor 35 is mounted between side plates 21 and 22 on a platform 36 supported on the parallel cross-bars 37 by means of the clamp members 37'. Rigidly mounted spaced apart on the upper surface of the platform is a pair of angle members 38 having threaded bearing openings for threadedly engaging with elongate screw or worm 39. The screw 39 mounts a handwheel 40 at one end thereof for selectively rotating same to reciprocate the carriage 41 linearly, said carriage being supported for axial movement on the screw 39 in a well known manner. The motor 35 is directly installed on the carriage 41. The drive shaft 42 of the motor has a variable pulley 43 secured on the protruding end thereof which is coupled by means of the pulley belt 44 with pulley 45 fixed on the protruding end of the input shaft to a gear reduction system encased in the housing 46 also supported on the platform 36 spaced from motor 35. The output shaft 47 from the housing 46 carries a sprocket wheel 48 which is coupled by sprocket chain 49 with the sprocket wheel 50 mounted for rotation with the shaft 51 adjacent the upper ends of side plates 21 and 22.

The shaft 51 is horizontally arranged and journalled at its respective ends in suitable bearing blocks secured on said side plates one of said blocks being seen in FIG. 10 at 51'. The shaft 51 is located adjacent the end 52 which will be referred to as the rear end of said apparatus by reason of the contemplated path of movement of the packages on the apparatus from left to right in FIGS. 7 and 8. The speed reduction ratio afforded by system 46 is selected to rotate shaft 51 within a range of suitable speeds any one of which is selectable by means of the hand wheel 40 to vary the linear distance between shaft 42 and the axis of rotation of pulley 45. Sprockets 48 and 50 preferably are identical so that they are rotatable at the same angular speed, as will be the shaft 51.

Shaft 51 may be considered the rear drive shaft by reason of its location adjacent rear end 52, said shaft mounting a plurality of sprocket wheels axially spaced along the length thereof which are coupled by flexible drive means with other mechanisms of the apparatus. Adjacent the opposite or front end 53 of the apparatus is a front drive shaft 54 journalled at its ends in the bearing blocks 55 supported on the side plates respectively. Shaft 54 is horizontally arranged between the side plates in the same plane as the rear drive shaft 51 and looped between said shafts in the conveyor mechanism 56 located to move in the passageway 30. The conveyor 56 is illustrated as comprised of a pair of endless belts or sprocket chains respectively looped around sprocket wheels 58 carried on the shaft 54 (FIG. 9) and similar sprockets provided on the shaft 51 to provide a pair of horizontal upper reaches 59 disposed in the passageway 30 for transporting packages from front end 53 to rear end 52 of the apparatus. The linear speed of the conveyor reaches is controllable within predetermined limits by adjustment in position of motor 35 relative the housing 46, as previously explained. Supported between the reaches 59 co-planar with plates 24, 26 and 27 is an elongate metal strip 60, said strip 60 extending lengthwise from front end 53 where its opposite end 61 is located to the right of passageway 28 as seen in FIG. 7. The strip 60 assists in supporting the packages carried on the conveyor.

The printing means of the apparatus is located between end 61 of support strip 60 and rear end 52 of the apparatus. As explained, the printing means may constitute a single unit suitably situated with respect to the conveyor for applying the desired imprint either to the top end or bottom end of a package. Also, the apparatus is operative to accommodate a pair of printing units suitably situated to simultaneously apply an imprint to both ends of the package. This will become apparent from the ensuing description.

Referring to FIG. 8, there is shown a rotatable printing device 62 having its axis of rotation disposed below the table surface of the apparatus for applying an imprint to the bottom ends of successive packages carried on reaches 59. Although illustrated with particularity, it will be appreciated that same is intended only to be exemplary of one type of rotary printing device which may be employed. The device 62 includes a casing 63 of generally rectangular configuration mounted at one end thereof for rotation with shaft 64, said housing carrying indicia bearing type members arranged to protrude outwardly of the opposite end 65 which is seen to be curved slightly for known reasons, said end 65 being referred to as a printing end. For purposes of permitting adjustment in the position of shaft 64 relative the table plates of the apparatus so that the device 62 may be used to imprint upon the bottoms of packages which are concave in varying degrees of curvature, shaft 64 is supported at one end thereof in an adjustable bearing mounting 66 (FIG. 10) carried on the exterior of side plate 22. The bearing mounting 66 will be described in detail subsequently herein.

Device 62 is positioned to be rotated so that the printing end 65 thereof will pass between the reaches 59. The driving means for the device 62 includes the flexible drive member 67 in the form of a sprocket chain, looped between suitable sprocket wheels fixed respectively on rear drive shaft 51 and the shaft 64. Although not shown in connection with printing device 62, suitable rotatable inking means for the said device preferably is installed to be driven from shaft 64. As seen in FIG. 8, partially visible pulley belt 68 would be looped around a suitable sprocket on the shaft 64 and extended downwardly and rearwardly for connection with a similar sprocket carried on a shaft supporting such a rotatable inking device. Thus, the device 62 may be seen to be rotatable on an axis transverse to the direction of travel of reaches 59 and spaced below said reaches and the table plates 24, 26 and 27. The printing end 65 will pass between the reaches 59 to apply an imprint to a package carried thereon during a predetermined part of the cycle of revolution of said printing device 62.

Also shown in FIG. 8 is a rotatable device 69 which has its axis of rotation parallel with and vertically spaced above the shaft 64 and the reaches 59. Device 69 may comprise a rotatable printing device similar to device 62 for imprinting upon the upper end of a package simultaneously with imprint transfer to the bottom end thereof or may merely comprise a pressure or bearing member, similar in construction to device 62 albeit, lacking indicia bearing type members. The device 69 is mounted for rotation on a shaft 70 journalled in a carriage 71 which is vertically reciprocable relative the reaches 59 on a pair of columns or standards 72 supported upright on the side plate 22. Manual operable means for selectively advancing and retracting said carriage relative to the conveyor reaches are indicated generally at 73 and will be described in detail subsequently herein.

For rotating the device 69, shaft 70 mounts a sprocket 74 around which is looped a drive chain 75 of sufficient length to be extended downwardly through a suitable passageway in the plate 27 for engagement around a sprocket 76 carried on a spring-loaded idler mechanism 77, although other support means for the sprocket 76 might be employed with less advantage. As seen in FIG. 10, strand 78 of chain 75 is disposed to engage a sprocket wheel 79 fixed on shaft 64 and be driven thereby upon rotation of shaft 64. The spring-loaded mechanism 77 will be described in fuller detail subsequently herein, it being sufficient at this time to appreciate that same assists in the desirable adjustments capable of being made in the vertical position of device 69 while enabling said device 69 to be driven from the same drive mechanism for the printer 62.

As thus far described, it will be understood that packages loaded on reaches 59 at front end 53 of the apparatus will be carried toward the printing device 62 in a haphazard arrangement. Since the device 62 rotates into position for applying an imprint only at a predetermined part of its cycle of revolution, merely transporting the packages into the prescribed printing zone of the apparatus while in such a haphazard arrangement would not permit proper imprinting on successive packages. To provide for proper feeding of the packages into said printing zone correlated with the cyclic printing position of the device 62, the invention includes novel package feeding means designated generally by the reference character 80.

The package feed means 80 includes a worm feed member 81 positioned with its axis of rotation spaced above table plate 26 and laterally spaced from and parallel with the path of travel for the packages defined by the reaches 59. The linear speed of the moving packages ordinarily is greater than the speed of axial travel of the worm feed member (considering a line along the periphery of the worm). A package on the reaches 59 initially is engaged by the worm member and caused to follow the worm considered in such axial travel thereof, which is at a slower speed, thereby momentarily reducing the linear speed of travel of the package on the conveyor. The pitch of the worm thread is purposely made variable so that after the package engaged thereby is caused to move at a reduced linear speed, the linear speed of the package is accelerated so that at the time the package withdraws from engagement with the worm feed member, it again is traveling at a speed equal to the speed of the conveyor. As a result, the packages of the line are intermittently engaged and released by the worm feed member such that upon being fed to the printing zone, they are arranged at properly spaced intervals correlated with the printing cycle of device 62 for successively receiving an imprint therefrom at a predetermined identical location on each of the packages.

The worm feed member 81 comprises an elongate cylinder 82 preferably formed of metal and having perforated transverse end walls through which protrude respectively the ends 83 and 84 of a shaft on which the cylinder is fixedly supported. The shaft ends 83 and 84 are journalled each in a suitable bearing 85 mounted at the upper end of a vertically arranged framework designated generally 86. The frame 86 is formed by parallel bars or standards 87 and 88, the standard 87 extending vertically through the passageway 28 and the standard 88 extending vertically through the slot 31. Each of the bearings 85 is located at the upper end of a said standard with the shaft mounting the cylindrical member 81 therebetween. At their opposite or bottom ends, said standards are connected by a cross-brace or tie-rod 89 and intermediate portions of the standards are connected by a second cross-brace or rod 90. Thus, worm feed member 81 will be supported at the upper end of the framework 86 spaced above the plate 26. The worm thread is designated 151.

Shaft end 84 is engaged through the journal 85 and the standard 87. As seen in FIG. 8, said protuberant end 84 mounts a pulley 94. Mounted intermediate the ends of said standards is an elongate shaft 95 suitably journalled as indicated at 96. The ends of said shaft protrude outwardly of the standards 87 and 88 for engagement respectively in ball-bearing pillow blocks 97 and 98 bolted to the inner surface of side plate 22 whereby, the framework 86 may be seen to be supported on the shaft 95 which is journalled at its ends in the side plate 22 below table plate 26.

The portion 99 of shaft 95 protruding outwardly of standard 87 carries a sprocket wheel 100 which is located between pillow block 97 and standard 87 and is coupled with the sprocket 94 by means of drive chain 101 for rotating the worm feed member 81. It will be noted from FIG. 9 that sprocket 100 is larger in diameter than sprocket 94 and has more sprocket teeth. The relationship selected for said sprockets is 2 to 1, namely, the diameter of sprocket 100 is twice the diameter of sprocket 94 and sprocket 100 has twice as many sprocket teeth. Thus, the speed at which the sprocket 94 is rotated will be substantially one-half the angular speed of sprocket 100 and the shaft 95 on which sprocket 100 is mounted is connected to be driven from the motor 35.

As seen in FIGS. 8 and 9, shaft 95 has a portion thereof 102 exterior of standard 88 journalled in pillow block 98 and connected on the extremity of said portion is a miter gear 103 which is meshed with a companion gear 104 carried on the adjacently disposed shaft 105. Shaft 105 is journalled at its opposite ends in suitable bearing blocks 106 secured on the side plates and is arranged parallel with and spaced below the front drive chain shaft 54. Said shafts 54 and 105 are coupled by a drive chain 107 looped between sprocket 108 carried on shaft 54 and sprocket 109 carried on shaft 105, said sprockets being substantially identical so that shafts 54 and 105 are rotatable at the same angular speed. Thus, upon rotation of shaft 54, shaft 105 is rotated to effect rotation of shaft 95 through the meshed miter gears 103, 104 at an identical angular speed, however, because sprocket 94 is only one half the size of sprocket 100, the angular speed at which worm feed member 81 is rotated will be substantially one-half the angular speed of shaft 95.

Referring to FIG. 9, the framework 86 will be seen to be pivotally mounted under tension to realize important advantages in connection with operation of the worm feed member. Rod 89 has a block 110 secured to a medial portion thereof presenting a flat surface facing side plate 22. Threadedly engaged through a bearing block 111 secured on the exterior surface of side plate 22 is a thrust member in the form of a thumb screw 112 having its flared head 113 exterior of the side plate and its opposite end disposed to bear against the facing surface of block 110. One end 114 of a coil spring 115 is connected to a medial portion of rod 90, the opposite end of said spring being suitably connected to side plate 21 as indicated at 115'. Since framework 86 is rotatably supported on the shaft 95, the action of spring 115 is normally to bias the framework to rotate in a clockwise direction or toward the side plate 21 opposite the plate 22 on which shaft 95 is journalled. By selectively positioning the shank of screw 112, the angle of inclination of framework 86 relative a plant perpendicular to table plate 26 can be adjusted to releasably lock the framework 86 in any one of a plurality of positions in which the axis of rotation of worm feed member 81 is laterally spaced from the path of travel of the conveyor reaches 59 to accommodate a predetermined size package for proper feeding by said member 81 into the printing zone of the apparatus. A lock nut 116 threaded on the screw 112 exterior of the side plate 22 enables said screw to be fixed, in any position to which it is adjusted.

The angle of inclination of framework 86 therefore determines the lateral spacing between the axis of rotation of worm feed member 81 and the midpoint between reaches 59. However, by selected tension for the spring 115, the framework 86 is enabled to pivot to a limited extent in a direction against the normal bias of the tension spring 115 whereby the worm feed member 81 will move laterally outward relative the midpoint between reaches 59. Thus, the framework may be characterized as being resiliently mounted so that any transverse force applied against the worm feed member in a direction opposite to the normal bias of spring 115 will permit the worm feed member to withdraw from the conveyor and return to its adjusted position upon removal of said transverse force thereagainst. Such a circumstance would arise if a package engaged by the worm feed member is larger in size than intended to be engaged thereby by reason of its adjusted position or if there is a jamming of the packages passing the worm feed mechanism. This resilient mounting for the worm feed member will prevent distortion or damage to feed member 81 under the enumerated circumstances.

For purposes of describing the specific structure of worm feed member 81, recourse first will be had to FIGS. 4 through 6 in which is illustrated a worm feed member designated generally 120. The members 81 and 120 are substantially identical in construction and will be seen to differ in the axial length thereof and the pitch of the respective thread members arranged on the circumference thereof. The worm feed member 120 is designed to be operative in connection with only a limited number of sizes of packages whereas because of the increased length of member 81, adjustments can be made for operation with a greater number of packages of different sizes.

In FIG. 4, member 120 may be seen to comprise a cylinder 121 preferably formed of metal and closed at opposite ends thereof by perforated transverse walls, such as wall 122. The cylinder is fixedly mounted on a shaft 123 which has its ends protruding outwardly of end walls 122. For purposes of description, the end wall 122 visible in the figure will be considered the front or forward end of the cylinder and the opposite end wall, the rear end. The cylinder 121 is of uniform external diameter and helically wound thereon is a continuous thread member 124. The member 124 is wound at a variable pitch commencing from adjacent the front end of the cylinder. There is provided a groove 125 (FIG. 6) in outer circumferential surface of cylinder 121 the bottom surface of which is inclined, with the portion of greatest depth slightly spaced inwardly of the front end of the cylinder. The groove extends in the direction of pitch desired for winding the thread member commencing at said front end of the cylinder. The end 126 of the thread member is secured in said groove 125 by means of the screw 127 so that said end has its upper surface tapering toward the circumferential surface of the cylinder, as indicated at 128. The end 126 is spaced from the front end wall a small distance indicated at 129. Commencing from end 126, thread member 124 is helically wound at progressively increased angles of pitch toward the rear end of the cylinder where the opposite end 130 of the member 124 is secured directly on the exterior surface of the cylinder as by the fastener 131. As shown by the character 132, opposite end 130 is spaced inwardly of the rear end of the cylinder a small distance. It will further be noted that end 130 is not seated in a groove such as employed for the end 126 of member 124 and therefore projects above the circumferential surface of cylinder 121 a uniform distance. As a result, the axial spacing between adjacent convolutions of the thread 124 in vicinity of leading end 126 is less than the spacing between adjacent convolutions in vicinity of trailing end 130. However, the tapered surface 128 permits accommodation of a larger diameter package within certain limits.

Thread member 124 is formed from a hard material such as hard rubber or from a composition of rubber and fabric or other suitable material which preferably can afford some traction between itself and the package engaged thereby. As seen in FIG. 6, the cross-sectional configuration of member 124 is substantially isosceles trapezoidal with the top and bottom sides parallel and the shorter of said two sides at the top. In the installed position of worm feed member 120, the end 126 will be leading and end 130 will be trailing from a standpoint that a package will first be engaged by the member 120 at end 126 and released after traversing the thread member at end 130.

The variable angle of pitch of thread member 124 commencing from leading end 126 thereof is predetermined to contribute particular results in connection with the proper feeding of packages into the printing zone of the apparatus. The selected variable pitch is related to the linear speed of the conveyor reaches and the angular speed of the printing device 62 so that each package will be properly deposed in the printing zone for receiving an imprint at the precise printing position of the printing device. This will become more apparent from the subsequent description of the operation of the apparatus.

Packages deposited on the conveyor reaches at the front end 53 of the apparatus 20 are properly guided in their linear movement toward the package feed means by an upstanding parallel guide means such as seen in FIG. 7, disposed on opposite sides of the passageway 30.

In addition, said guide means are selectively adjustable one relative the other. Said guide means or tracks include a pair of elongate rails 133 and 134 formed of metal strip material arranged upstanding end to end and substantially parallel with the conveyor reaches 59 and passageway 30. Each of said rails is secured to the ends of horizontally arranged pins 135, each pin 135 being movably accommodated in a transverse opening provided in a post 136 supported on table plate 24, as seen in FIG. 9. Each pin has a knob 137 by means of which the pin can be retracted and advanced and secured in any selected position by means of a lock screw threaded into the upper end of post 135 normal to the pin, said lock screw provided with a wing type head 138 visible in said figure. Thus, by advancing or retracting pin 135, the position of said rails one relative the other and relative the reaches 59 may be adjusted.

The rails 133 and 134 also may be formed as an integral structure seen at 133' in FIG. 1, however, same have been provided as a pair of members for an advantageous purpose in connection with worm feed member 81. As explained, the rails 133 and 134 are arranged end to end along the length of the apparatus 20 on one side of passageway 30. Rail 133 has an end 139 thereof protruding beyond the front end 53 of the apparatus. The opposite or inner end 140 of rail 133 is spaced from the inner end 141 of rail 134, said end 141 being laterally offset outwardly relative to the major extent of the rail 134. The opposite end 142 of rail 134 extends to the rear end 52 of the apparatus. Said adjacent ends 140 and 141 may be seen to be located at a position normal to a point between the ends of the cylinder 82 in the installation of FIG. 7, or that of FIGS. 11 and 12.

Parallel with the passageway 30 and on the opposite side thereof is provided an upstanding guide rail 143 adjustably supported on the plate 26 in the manner as described for rails 133 or 134. The rail 143 has one end 144 thereof overhanging the end 53 of the apparatus to the same extent as end 139 of rail 133 and its opposite end 145 slightly spaced from the forward end of the cylinder 82. Mounted on the table plate 27 is a guide rail 146 which reaches from rear end 52 of the apparatus to approximately the passageway 28, as indicated at 147 in FIG. 7. The rail 143 also is adjustably mounted relative the passageway 30. Thus, there is provided an elongate clearance space between the end 147 of guide rail 146 and inner end 145 of rail 143 in which the worm feed member 81 is operably positioned. Of course, where the apparatus is constructed for use of the worm feed member 120, the spacing between ends 145 and 147 of said rails 143 and 146 will be reduced accordingly. For instance, in the apparatus of FIG. 1 wherein the worm feed member 120 is illustrated, the ends 145' and 147' of the rails 143' and 146' respectively will be spaced apart a correspondingly lesser distance to accommodate the worm feed member 120 in operational position therebetween, said member 120 being shorter in length than member 81.

*Operation of Apparatus 20*

Except for adjustments in the guide rail means of the appaartus, operation thereof is substantially identical either with use of worm feed member 120 or worm feed member 81. Operation of the apparatus will first be discussed where the worm feed member 120 has been installed, reference being had to FIGS. 1, 2 and 3. Where the structural features of the apparatus illustrated in these figures are the same as or equivalent to those described in connection with apparatus 20, the same characters of reference in primed form are employed for identification purposes. The imprinting apparatus in these figures will be referred to generally as apparatus 20'.

Referring to FIG. 1, apparatus 20', only pertinent portions of which have been illustrated for purposes of this description, has been adjusted for accommodation of packages P. The conveyor is designated 56' and although somewhat different in construction from conveyor 56, functions in the same manner to transport packages from one end to the other of the apparatus. There is a longitudinally extending passageway 30' in which a reach 59' of the conveyor is movable. Instead of a pair of guide rails 133 and 134 there is a single guide rail 133' which is adjustably mounted on the table plate 24' relative the passageway 30'. On the opposite side of passageway 30' are the guide rails 143' and 146' parallel with the rail 133'. The distance between guide rails 143', 146' and rail 133' is approximately equal to the diameter of the body 15 of a package P, all of said packages being identical. Adjustment of the guide rails one relative the other is enabled by the movable pins 135' to which the guide rails respectively are secured. Further, the spacing between said guide rails is adjusted so that packages deposited upon the conveyor will be centered on the reach 59'.

As seen in FIG. 1, the packages are transported on the reach 59' from left to right toward the worm feed 120 from the loading end of apparatus 20', which would correspond to end 53 of apparatus 20. At this time the the packages are transported at a linear speed corresponding to the speed of the conveyor 56' and greater than the axial travel of worm 120 (considering a line on the periphery thereof). The packages are usually bunched together at their approach to the worm feed 120. In FIG. 1, the lead package $P_1$ of the line already has traversed worm feed 120 and the second package $P_2$ is shown at initial engagement position with the worm thread 124. To achieve this engagement, the axis of rotation of worm feed 120 is located so that the linear distance between the inside surface of rail 133' and the periphery of cylinder 121 is slightly greater than the diameter of the package P. Thus, the thread 124 projects into the path of movement of the line of packages. Each package of the line first engages the thread adjacent the lead end 126 thereof and follows the thread in its helical movement engaged against the rear lateral face 148 thereof. The packages are thus disposed to follow the thread 124 as distinguished from being driven or moved thereby. This is further apparent from FIG. 1 wherein a clearance space 149 is shown between the surface of engaged package $P_2$ and the periphery of cylinder 121 to permit such movement of the package trailing the thread 124.

Because of the variable pitch of the thread from leading end 126 to trailing end thereof, the package $P_2$ is caused to follow the first convolution of the thread at a linear speed which is less than the speed of the conveyor reach 59'. However, the linear speed of the package thereafter increases as it approaches the trailing end 130 of the worm thread because of the greater pitch thereof and upon reaching the position in which package $P_1$ is disposed in FIG. 1, package $P_2$ will be traveling at the same speed as the conveyor 56' and withdrawn from or leading thread 124. At that time, package $P_2$ will be spaced from the package immdeiately behind it the same distance package $P_1$ is spaced from package $P_2$. This linear spacing between packages $P_1$ and $P_2$ is the desired proper spacing interval for successively feeding packages to the printing zone of the apparatus 20'. After traversing the worm feed 120, the packages will be carried at properly spaced intervals therebetween at the linear speed of the conveyor 56'. Shown in phantom outline 150 is a package which is disposed in the printing zone overlying the printing device 62'. It will be noted that the spacing between package 150 and $P_1$ is approximately identical to the spacing between package $P_1$ and package $P_2$. The package 150 has been carried into the printing zone at the precise part of the cycle of revolution of printer 62' when the printing end thereof can apply the imprint to the bottom of the package.

Referring to FIG. 2, the apparatus 20' has been illustrated equipped to apply indicia both to the upper and lower ends of packages supplied to the printing zone. The package $P_1$ is illustrated as approaching in proper position to receive the imprints simultaneously whereas package $P_3$ has already received the imprints and is on its way to the unloading end of the apparatus. The interval of spacing between these packages corresponds to the spacing interval between packages $P_1$ and 150 of FIG. 1. It may further be noted that each of the devices 62' and 69' are illustrated as printing devices rotating in opposite directions. Further, each end of each printing device has been constituted a printing end in this illustration of the invention, suitable spacing intervals between packages fed to the printing zone being obtainable by proper selection of the variable pitch of the worm thread 124. In addition, the upper printing device 69' functions to bear down upon the cap 17 of the package $P_1$ at the same time the imprint is applied to bottom of the package by printer 62' to prevent the package from being lifted during imprinting on the bottom surface thereof.

Referring now to FIG. 11, the fragmentary plan view illustrates operation of the worm feed member 81 in connection with a moving line of packages (from left to right) which are smaller in diameter than the packages of FIG. 1. The spacing between guide rails 133 and 134 and 143 and 146 has been adjusted to center the packages on conveyor reaches 59. It will be noted that rails 133 and 134 are aligned in the same plane and hence, the spacing between the rails on opposite sides of passageway 30 is uniform. The axis of rotation of worm feed 81 is adjusted so that the spacing between rail 133 and the circumference of cylinder 82 is slightly greater than the diameter of the package being accommodated between the rails. In this illustration, the worm thread 151 of the member 81 engages the packages initially effecting a slowing down of their linear speed of movement by causing same to follow the helical convolutions of the worm thread from the leading end 152 to the trailing end thereof adjacent end 153 of the cylinder. Because the cylinder 82 is longer than cylinder 121 more packages will be disposed engaged along its axial length, however, upon passing the end 153 thereof, the packages will be spaced apart at predetermined equal intervals correlated to the printing cycle of the printing device 62. This interval of spacing is that between the package $P_4$ and package $P_5$ and that between $P_5$ and $P_6$ in FIG. 11. The proper position of the axis of rotation of the cylinder 82 will have been adjusted by means of the screw 112.

In FIG. 12, adjustments have been made in the guide rails and in the location of the axis of rotation of worm feed 81 to accommodate printing upon packages of a size larger than those illustrated in FIG. 11. Because the packages of FIG. 12 are larger they could not be accommodated between the first or second pair of convolutions commencing at leading end 152. It is necessary to cause their engagement with the worm member at a point axially inward from leading end 152 a greater distance than in the instance of FIG. 11 so that the package can be accommodated between adjacent convolutions of sufficient pitch. To effect this phenomenon, the guide rails 133 and 143 are offset relative rails 134 and 146. Thus, as seen in FIG. 12, the rail 134 is offset inwardly or toward passage 30 relative the rail 133 with the end 141 inclined inwardly relative end 140 of rail 133. The rail 143 likewise is offset inwardly relative the rail 146 so that there is achieved a pair of offset tracks or paths of movement along which the packages will travel in traversing the imprinting apparatus. The spacing between rails 133 and 143 is identical to that between rails 134 and 146. As seen in FIG. 12, the worm feed 81 is disposed between the opposite ends 145 and 147 of rails 143 and 146 respectively. The position of cylinder 82 is adjusted by means of the screw 112 so that the distance between rail 134 and the circumference of the cylinder is slightly greater than the diameter of the package by the amount indicated by clearance space 155, whereby the distance between said circumference and the rail 133 is even greater by the linear offset distance between rails 133 and 134. This offset distance is selected so that the packages guided between rails 133 and 143 will clear the worm thread 151 at positions thereof which will not permit accommodation of a package between adjacent convolutions.

Accordingly, the packages, such as package $P_7$ seen in FIG. 12 guided by rails 133 and 143, are enabled to move linearly along the conveyor 56 without engaging the worm thread 151. However, when the package $P_7$ engages inclined portion 141, it will be caused to move into an offset path of movement provided between rails 134 and 146 at the precise instance desired for engaging same with the worm thread 151 as shown by package $P_8$ i.e., at a point where the adjacent convolutions can accommodate a package therebetween. The package $P_8$ is shown in position to be received between a pair of adjacent convolutions of thread 151, a phenomenon which had occurred previously with packages $P_9$ and $P_{10}$, the desired interval of spacing achieved being that between said packages $P_9$ and $P_{10}$. The provision of the adjustable guide tracks or rails 133, 143, 134 and 146 and the adjustability feature of the worm feed means by means of screw 112 enables the apparatus to be used for larger sizes of packages while still achieving the proper spacing intervals between packages fed to the printing zone of the apparatus.

Some of the mechanisms which have been referred to heretofore, but not described in detail, will now be considered.

Bearing Mounting 66

Adjustment in the position of the shaft 64 which provides the axis of rotation for the lower printing device 62 is desirable so that the printing end 65 may pass between the reaches 59 at different horizontal levels. For this purpose, an adjustable mounting 66 for shaft 64 is provided which includes an arcuate slot 160 in side plate 22 in which the shaft 64 may be adjusted in a vertical direction. The shaft 64 has an end thereof extended transversely through said slot where it is journalled in a bearing block 161 carried at one end of a pivotally mounted lever 162. The opposite end of the lever is pivotally secured on the outside surface of plate 22 as indicated at 163. The lever 162 may comprise an angle member or may be a strip of metal flush with the lower edge 164 of which is attached a block 165 by bolts 166. An adjustable stop device is secured on the plate 22 comprising a perforated metal member 167 secured by bolts 168 to plate 22 and accommodating an elongate bolt 169 through the perforation thereof. The bolt 169 is threadedly engaged through member 167 with the end 170 thereof adapted to bear against the block 165 to function as an adjustable stop for preventing pivoting of lever 162. The head 171 of the bolt can be rotated to advance or retract the bolt 169 permitting adjustment in the position of shaft 64 in slot 160. A lock nut 172 is provided on the shank of the bolt to lock the same in any selected position of the shaft 64.

Vertically Adjustable Carriage for Device 69

Referring to FIG. 8, the carriage 71 on which the device 69 is journalled comprises a generally rectangular assemblage which may be formed by bolting together, as by bolts 173, a pair of mating half members, one of which is indicated at 174. The carriage 71 has a transverse passageway therethrough for accommodating each of the parallel, vertically arranged standards 72 with the carriage being slidable relative said standards. The standards 72 are joined at their upper ends by the plate 175 secured by suitable nuts 176 to said standards, said standards extending downwardly through suitable openings in the plate 27 where they are secured rigidly adjacent the lower ends thereof to the inner surface of side plate 22 by suitable anchor straps 177 and bolts 178. Additional fastening means 177' are also provided for securing the standards intermediate their lower ends and their point of passage through the plate 27. Adjacent the upper surface of plate 27, the standards are connected by a lower plate member 179 and collars 180 through which the standards extend, said plate 179 being parallel to the upper plate 175. An elongate screw member is secured vertically at one end 182 thereof, through suitable journals 183 supported on plate 175, to a hand wheel 184. The opposite end 185 of the screw is engaged against the bottom plate 179. The threaded shank of the screw is threadedly engaged through the carriage 71 between standards 72 so that the carriage can be advanced or retracted in response to selected rotation of hand wheel 184.

*Spring Loaded Idler Mechanism 77*

Spring loaded mechanism 77 enables rotation of shaft 70 mounting device 69 from the same source 35 while permitting adjustment in the vertical distance of shaft 70 relative the conveyor, said mechanism carrying the sprocket 76 with which the sprocket 74 on shaft 70 is coupled by means of drive chain 75. Said mechanism includes a pivotal bar or lever 186 at one end of which is mounted a shaft 187 on which the idler sprocket 76 is journalled. At its opposite end, the lever 186 is bifurcated for pivotally mounting same on shaft 188 by means of the fastener 189, said shaft 188 being journalled between the side plates. A coil spring 190 is connected at its ends between the bar 191 fixed on shaft 188 axially spaced from lever 186 and the bolt 192, said spring 190 normally biasing the lever 186 to pivot downwardly for moving the sprocket 76 in a direction away from sprocket 74 with which it is coupled. Thus, as the carriage 71 is moved upwardly relative the table surface of the apparatus, the lever 186 can likewise pivot upon shaft 188 against the bias of spring 190 and vice versa when the carriage 71 is lowered. Thus, the distance between shafts 187 and 70 will remain unchanged so as to permit the use of sprocket chain 75 for all adjusted positions of the carriage 71.

Although no particular inking means have been illustrated in connection with apparatus 20, it may be understood such inking means may be provided in any of a variety of manners. For instance, in connection with the printing device 62, reference has been had to the flexible drive member 68 looped around a suitable sprocket carried on the shaft 64 on which device 62 is carried, and in FIG. 8, said drive member 68 is illustrated as extending downwardly and toward rear end 52 of the apparatus where same may be connected with a second sprocket mounted on a shaft supporting a rotatable inking device. The same type of arrangement may be considered in connection with the device 69 where in FIG. 8, a portion 193 of a drive belt is illustrated, same being connected to be driven from the shaft 70 and intended to be coupled with suitable mechanism (not shown) for driving inking means for the device 69.

Illustrated in FIG. 2 is another structure which is feasible for supplying ink to the printing devices of the apparatus 20', it being understood that same also may be employed in apparatus 20. The carriage 200 corresponds to carriage 71 previously described, same being reciprocably mounted on the vertically arranged columns 201. Mounted vertically between the columns is an elongate screw 202 which is threadedly engaged through the carriage 200 and has a hand wheel 203 at one end thereof by means of which the screw is selectively rotatable for retracting and advancing the carriage. The carriage 200 is comprised of an L-shaped metal member 204 one arm of which is secured by bolts 205 to the strap 206 so as to accommodate the columns 201 therebetween. The screw 202 passes through an internally threaded collar 207 retained between member 204 and strap 206. The second arm 208 of the member 204 is vertically arranged and adjacent its lower end is journalled the shaft 70' on which the printing device 69' is mounted. Adjacent its opposite or upper end, the arm 208 has a stub shaft 209 journalled therein. Mounted on the shaft 209 is an inking device designated 210.

The device 210 includes a disc 211 of porous material such as foam rubber or cellulose supported between a pair of plates of which one is indicated at 212. The disc 211 has a peripheral band protruding radially outward of the circumferential edges of the plates 212 which is arranged to be engaged by the protruding indicia bearing members 213 provided at opposite ends of the device 69'. The plates 212 may be supported on a collar 214 which is mounted on the shaft 209 by means of the screw 215. The device 69' is installed to be rotated counterclockwise in direction of arrow 216 and each time a printing member 213 engages the periphery of disc 211, the device 210 will be caused to rotate in the opposite or clockwise direction. Thus, no separate drive means in the form of flexible drive means is required in connection with inking device 210.

Further illustrated in FIG. 2 is a similar inking device 210' rotatably mounted at one end of the lever 217 in a manner similar to that described for device 210. The device 210 is located to transfer ink to the printing device 62' in a similar manner. Lever 217 may be supported at its opposite end on side plate 22' of the apparatus 20'.

Attention is invited to conveyor mechanism 56' illustrated in FIG. 1 which is somewhat different from the mechanism 56 illustrated in connection with apparatus 20. The difference resides only in that instead of the continuous conveyor reaches 59, mechanism 56' is comprised of conveyor segments associated end to end to form the entire mechanism. Thus, reach 59' is a single component which is cooperative with the pair of reaches 220 on which the packages are deposited after transversing the worm feed 120. The principle of operation of mechanism 56' is identical, namely, to provide a linear speed of movement for the packages which is greater than the axial speed of movement of the worm feed 120. Also, as shown in FIG. 2, upstanding lugs 221 may be provided spaced apart on the reaches of mechanism 56' a distance corresponding to the desired spacing between adjacent packages. The lugs 221 are shown engaged respectively behind packages $P_1$ and $P_3$.

Although not specifically illustrated, the apparatus 20 or 20' may be readily modified for applying an imprint to a lateral surface of a container. Such modification would comprise location of a printing device for rotation on an axis vertically arranged and laterally spaced from the path of movement of the moving line of packages. There might be required relocation of the guide rails 134 and 146, for instance, to accommodate proper placement of the printing device, or elimination of portions thereof, but such engineering details would come within the broad principles of the invention. Insofar as the worm feed mechanism is concerned, operation thereof would be the same.

In recapitulation, the apparatus 20 or 20' may be seen to include a conveyor moving at a constant speed and having a printing zone or station along the path of movement provided by said conveyor. A printing device is located in said zone or station which has a cycle of operation recurring at a rate related to the linear speed of the conveyor. Package feed means are provided ahead of said zone which comprises a variable pitch worm having an entrance or front end and a terminal or rear end. The worm is rotated at an axial speed considered along a line parallel to the conveyor which is less than the linear speed of the conveyor. The packages are engaged at the entrance end and released at the terminal end of the worm in proper synchronism with the operational cycle of the printing device.

It may further be noted that the speed of the conveyor and the angular speed of a printing device may be adjusted between limits. At the lower speeds of the range, the package, when released by the worm need not be traveling at the precise speed of the conveyor, reasonable correlation therebetween being sufficient. However, at the higher speeds, precise correlation is necessary and this is achieved by the package feed means of the invention. It may be noted that since the conveyor and printing device are coupled to the same source of power, increase or decrease in their operational speed is simultaneously accomplished through rotation of hand wheel 40.

It is believed the invention in all of its ramifications has been described in adequate detail to enable the skilled artisan to understand and practice the same. Minor variations in the size, proportion, arrangement and construction of the various parts and mechanisms are believed possible without departing from the scope of the invention as set forth in the claims hereto appended.

I claim:

Apparatus for applying an imprint consecutively to individual packages moving in a line and including, conveyor means for transporting said packages along a path of movement at a predetermined linear rate of speed, guide means for confining the packages to movement along said path, a printing zone along a portion of said path, movable printing means operatively disposed in said zone only at uniformly spaced time intervals, and package feed means for feeding packages individually into said printing zone at regularly spaced intervals correlated with the rate of speed of the conveyor and the intervals of time during which the printing means is so operatively disposed whereby each package is consecutively positioned to receive the imprint, said feed means including a worm feed device having its axis of rotation laterally spaced from said path with the worm thereof arranged to intercept packages moving along said path in advance of said zone, the speed of linear movement of the conveyor being greater than the speed of axial travel of the worm and the convolutions of the worm being variably pitched whereby each package engaged by the worm is caused to follow the worm in its axial travel at rates of speed varying from between a first speed which is less than the linear speed of the conveyor to a second speed which is substantially equal to said linear speed of the conveyor prior to entering said printing zone, said guide means comprising rail members upstanding on opposite sides of and parallel with said conveyor, said rails arranged to form said path of travel into a pair of offset portions connected one with the other, movement of said packages along one of said paths arranged to prevent interception thereof by said worm and movement of said packages along the second portion permitting such interception between adjacent convolutions of the worm spaced apart sufficiently to accommodate said package.

References Cited in the file of this patent

UNITED STATES PATENTS

| | | |
|---|---|---|
| 2,195,173 | Jackson | Mar. 26, 1940 |
| 2,397,305 | Wheat | Mar. 26, 1946 |
| 2,471,098 | Davies | May 24, 1949 |
| 2,563,496 | Schmidt | Aug. 7, 1951 |
| 2,630,904 | Bozek | Mar. 10, 1953 |
| 2,703,660 | Von Hofe et al. | Mar. 8, 1955 |
| 2,730,226 | Day et l. | Jan. 10, 1956 |
| 2,735,600 | Hohl et al. | Feb. 21, 1956 |
| 2,749,838 | Stover | June 12, 1956 |
| 2,768,656 | Day et al. | Oct. 30, 1956 |
| 2,775,193 | Mastella | Dec. 25, 1956 |
| 2,781,122 | Gueffroy | Feb. 12, 1957 |
| 2,854,125 | Johnson | Sept. 30, 1958 |